United States Patent [19]

Thoma

[11] 3,924,610

[45] Dec. 9, 1975

[54] APPARATUS FOR THE RECOGNITION OF THE INITIATON OF HEART BEAT, FROM AN ELECTROCARDIOGRAM UNDER EXTREME CONDITIONS

[76] Inventor: Herwig Thoma, 40/5, Maroltingergasse, Vienna, Austria

[22] Filed: Jan. 21, 1974

[21] Appl. No.: 435,385

[30] Foreign Application Priority Data

Jan. 31, 1973 Austria ................................ 852/73

[52] U.S. Cl. ............................................ 128/2.06 R

[51] Int. Cl. ............................................ A61b 5/04

[58] Field of Search...... 128/2.05 R, 2.05 S, 2.06 A, 128/2.06 B, 2.06 F, 2.06 G, 2.06 R, 2.1 R; 340/412, 414 A, 414 R, 414 Z, 253

[56] References Cited

UNITED STATES PATENTS

| | | | |
|---|---|---|---|
| 3,477,421 | 11/1969 | Partridge | 128/2.06 B |
| 3,524,442 | 8/1970 | Horth | 128/2.06 A |
| 3,554,187 | 1/1971 | Glassner et al. | 128/2.06 A |
| 3,569,852 | 3/1971 | Berkovits | 128/2.06 B |
| 3,626,367 | 12/1971 | Howard et al. | 340/412 |
| 3,672,353 | 6/1972 | Crovella | 128/2.06 A |
| 3,768,017 | 10/1973 | Dillman et al. | 128/2.06 R |
| 3,799,147 | 3/1974 | Adolph et al. | 128/2.05 S |

*Primary Examiner*—William E. Kamm
*Attorney, Agent, or Firm*—Neil F. Markva, Esq.

[57] ABSTRACT

An apparatus for the recognition of the initiation of heart beat, from an electrocardiograph under extreme conditions comprises at least one relatively wide band conventionally controlled ECG amplifier with which a plurality of filter and trigger stages connected in parallel are associated. A logic control system is provided which by reference to the pulses transmitted by the trigger stages automatically transmits that trigger pulse which is optimal for the recognition of cardiac activity.

10 Claims, 1 Drawing Figure

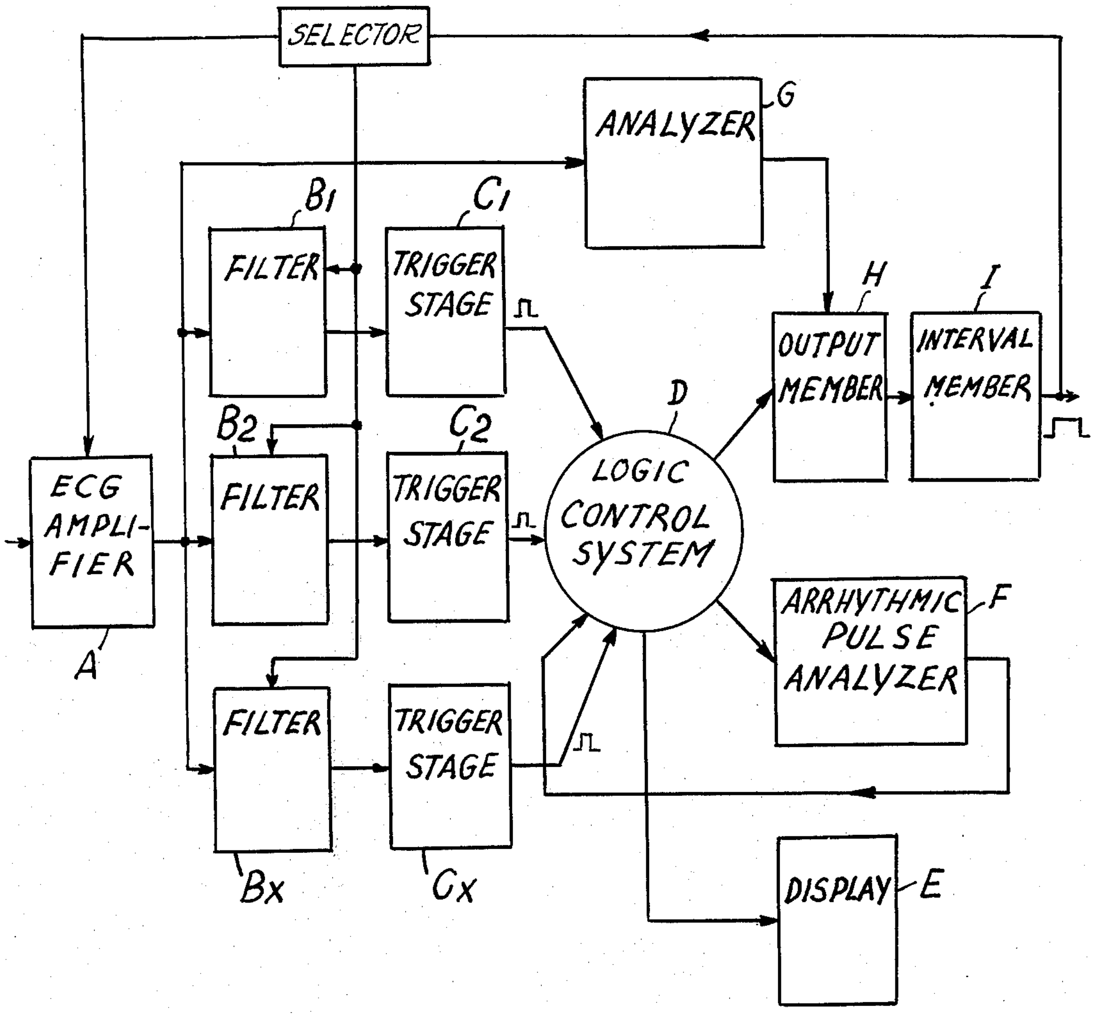
SELECTOR
ANALYZER
G
B1
C1
FILTER
TRIGGER STAGE
H
I
OUTPUT MEMBER
INTERVAL MEMBER
D
B2
C2
ECG AMPLIFIER
FILTER
TRIGGER STAGE
LOGIC CONTROL SYSTEM
A
ARRHYTHMIC PULSE ANALYZER
F
FILTER
TRIGGER STAGE
Bx
Cx
DISPLAY
E

APPARATUS FOR THE RECOGNITION OF THE INITIATON OF HEART BEAT, FROM AN ELECTROCARDIOGRAM UNDER EXTREME CONDITIONS

BACKGROUND OF THE INVENTION

This invention relates to apparatus for the recognition of the initiation of heart beat, from an electrocardiograph under extreme conditions, and consists in the use of an ECG amplifier in association with a number of fixed filters and trigger circuits connected in parallel and special logic control system.

The electrocardiographic recognition of heart activity is now an accepted requirement in the observation of patients who are very ill as well as in general clinical practice. A primary need in methods of clinical therapy, such as the mechanical assistance of cardiac action or in pacemaker therapy, is the recognition of the beginning of heart action, since the absence of this information adversely affects the apparatus and may put the patient at risk. Although makers of electromedical apparatus are and have been incessantly intensely concerned with this problem a completely reliable and faultfree recognition of the electrical manifestations of the heart beat is not yet possible. This is due on the one hand to the difficulties involved in tapping the electrical manifestations of the heart from the body of the patient, and on the other hand to the multiplicity of wave forms of the potential deflections of the heart action, particularly in very sick persons. Whereas in the field of work and sports medicine the first of these problems, i.e. that of the electrodes, is of major importance, the second is the primary problem in the field of intensive care. The following methods are at present conventional for recognizing the beginning of heart beat:

1. An assessment of the amplitude of the ECG by an amplitude trigger;
2. the extreme selection of a particular frequency band from the ECG followed by amplitude evaluation with a fixed trigger;
3. the employment of special filter characteristics for an assessment of different parts of the ECG, high frequency parts of the spectrum being moderately weighted over lower frequency ones, and
4. a combination of methods 1 and 3.

The combination according to 4 is theoretically very good for the purposes of intensive care, but it is difficult technically to carry out since the shape of the filter pass curve is usually nearly impossible to optimize because it depends too much upon the patient's age and the nature of his illness. The method according to 2 is free from interference and simple, but in the field of intensive care it cannot be used because the optimum ECG frequency spectrum for triggering is an unknown quantity in any particular patient and spontaneous changes often occur in the ECG.

SUMMARY OF THE INVENTION

It is the object of the invention to overcome this drawback of the frequency selective method of triggering.

To attain this object the present invention provides an apparatus for the recognition of the initiation of heart beat, from an electrocardiograph under extreme conditions, which comprises at least one relatively wide band conventionally controlled ECG amplifier; a plurality of filter and pulse-transmitting trigger stages connected in parallel and associated with said amplifier, and a logic control system which by reference to the pulses transmitted by the trigger stages automatically transmits that trigger pulse which is optimal for the recognition of cardiac activity.

BRIEF DESCRIPTION OF THE DRAWING

An embodiment of the invention will now be described by way of example and with reference to the accompanying drawing in which the only FIGURE is a block diagram of the proposed apparatus.

DESCRIPTION OF THE PREFERRED EMBODIMENT

The drawing shows an ECG amplifier A of substantially conventional construction. The ECG amplifier A delivers a standardized output voltage which is filtered in a number of filters $B_1, B_2 \ldots B_x$ connected in parallel. According to the invention these filters are narrow band filters and necessarily their number rises in proportion to their increasing selectivity. The entire frequency range may be from 3 to 100 cps, the range from 7 to 25 cps being highly selectively covered by say 8 filters, whereas according to the invention fewer filters are needed for the remaining higher and lower frequencies of the range. From a 50 cps A.C. mains supply network the 50 and 100 cps frequencies are rejected. A specific part of the ECG spectrum appears in the filter output. The voltage of this output is then used for triggering the following trigger stages $C_1, C_2 \ldots C_x$. The trigger response levels can be preadjusted or they may vary according to the amplitude of the respective input potential. A specific trace of the ECG will then control a specific combination of trigger stages. This combination might also serve for the identification of a specific condition. The crux of the invention resides in that in a logic control system D only that trigger pulse which is the highest in the spectrum is isolated and transmitted for further processing. Because only this pulse indicates the beginning of cardiac action as was found in a thorough investigation (reported in: H. Thoma, Automatische Regelung herzsynchroner Kreislaufpumpen, Z. Biomed. Technik, 1973, in course of being printed). The number of the associated filter is indicated in a display E since a spontaneous change-over to lower frequency filters may signify a deterioration in the condition of the patient. Since interference by outside voltages often contains higher spectral components it is further proposed, according to another feature of the invention, to analyser the pulse rhythm and to cause stray pulses and arrhythmic pulse trains to block the associated filter or its input into the logic control system D. To do this is the purpose of an arrhythmic pulse analyser F. The logic control system D will then prefer the next spectrally lower pulse and the rhythm of this will again be examined. Another analyser G checks the input voltage for amplitude and the presence of cyclic stray voltages (such as mains hum) and in the event of the input potential being too low or subject to considerable interference it blocks the output member H of the entire apparatus. The more selective the filter train the greater will be the tendency to oscillate. Consequently damping of the amplifier and the filters is effected by means of an interval member I, because the heart also has a refractory period at the end of the beat of about 0.2 seconds.

The proposed method permits the beginning of heart beat to be substantially more reliably determined by a narrow band selection from the ECG, even for the purposes of intensive care, without any special adjustment of instrumentation being necessary and without regard to the nature of the case and the patient's age.

The invention may be embodied in other specific forms without departing from the spirit or essential characteristics thereof. The embodiment is therefore to be considered in all respects as illustrative and not restrictive.

What is claimed is:

1. Apparatus for the recognition of the initiation of heart beat from an electrocardiograph under extreme conditions, said apparatus comprising:

a. at least one relatively wide-band conventionally controlled electrocardiographic amplifier connected to the output of the electrocardiograph and having a voltage output, b. a plurality of filter means covering a frequency spectrum and being electrically connected in parallel to the voltage output of the amplifier for filtering the entire output range of the electrocardiograph, c. each filter means having a respective voltage output, d. a plurality of trigger means wherein each trigger means is electrically connected to the voltage output of a respective filter means and is responsive to the pulse produced at said voltage output, e. each said trigger means having an output for transmitting trigger pulses, f. a logic control means electrically connected to all the pulse-transmitting outputs of said plurality of trigger means for receiving all said trigger pulses, g. said logic control means having an output for transmitting that trigger pulse from all the trigger pulses received, that is optimal for the recognition of cardiac activity, and h. means electrically connected to said output of the logic control means for displaying the initiation of the heart beat.

2. An apparatus as defined in claim 1 wherein said logic control means transmit the pulse received from the filter means that is highest in the frequency spectrum to the displaying means.

3. An apparatus as defined in claim 1 wherein each filter means comprises a narrow-band filter and the total number of said filters is in proportion to the increasing selectivity of said filters.

4. An apparatus as defined in claim 1 wherein an arrhythmic pulse analysing means is connected to the logic control means to examine the rhythm of the pulses selected by the logic control means.

5. An apparatus as defined in claim 4 wherein said analysing means operates to block stray pulses and highly arrhythmic pulse trains in the logic control means.

6. An apparatus defined in claim 1 wherein an interval member is electrically connected to the output pulse of the logic control means for briefly inactivating the input amplifier or the filter for the suppression of interference and oscillations.

7. An apparatus as defined in claim 1 wherein an analysing means is connected to the output of the logic control means for blocking the output amplitude of the logic control means in the presence of cyclic interference or when the amplitude of the input function is too low.

8. An apparatus as defined in claim 1 wherein said filter means includes filters which at least partially suppress the fundamental wave and the first overtone of the mains supply.

9. An apparatus as defined in claim 1 wherein each filter means comprises a narrow-band filter and said parallel filters are non-lineraly graduated for matching the spectrum of a normal electrocardiographic signal.

10. An apparatus as defined in claim 1 wherein said displaying means includes a monitor which indicates the number of the filter means which has produced the trigger pulse that is optimal for the recognition of the cardiac activity.

* * * * *